United States Patent [19]

Pecht et al.

[11] Patent Number: 5,172,918
[45] Date of Patent: Dec. 22, 1992

[54] SECONDARY SEAL FOR GAS TURBINES

[75] Inventors: Glenn G. Pecht, Vernon Hills; Peter L. Kay, Arlington Heights, both of Ill.

[73] Assignee: John Crane Inc., Morton Grove, Ill.

[21] Appl. No.: 874,828

[22] Filed: Apr. 28, 1992

[51] Int. Cl.$^5$ ................................. F16J 15/34
[52] U.S. Cl. ..................... 277/96.1; 277/815; 277/84; 277/85; 277/197
[58] Field of Search .................. 277/96.1, 81 S, 84, 277/85, 58, 197, 198, 157, 192

[56] References Cited

U.S. PATENT DOCUMENTS

| | | | |
|---|---|---|---|
| 603,736 | 5/1898 | Prendergast | 277/157 |
| 774,886 | 11/1904 | Magnusson | 277/157 |
| 2,365,046 | 12/1944 | Bottomley | 277/85 |
| 2,839,317 | 6/1958 | Haake | 277/85 |
| 4,082,296 | 4/1978 | Stein | 277/96.1 |
| 4,132,417 | 1/1979 | Lagerqvist | 277/198 |
| 4,889,348 | 12/1989 | Amundson et al. | 277/96.1 |
| 4,943,069 | 7/1990 | Jinnouchi | 277/96.1 |
| 4,969,652 | 11/1990 | Munson | |

FOREIGN PATENT DOCUMENTS 0799010  7/1958  United Kingdom ............... 277/85

OTHER PUBLICATIONS

Munson et al., "Development Film Riding Face Seals for Gas Turbine Engine" *Tribology Transactions*; vol. 35, 1992, pp. 65-70.

Primary Examiner—William A. Cuchlinski, Jr.
Assistant Examiner—Daniel G. DePumpo
Attorney, Agent, or Firm—Kinzer, Plyer, Dorn McEachran & Jambor

[57] ABSTRACT

A secondary seal for use in a high temperature environment, including only non-elastomeric elements, includes split high temperature carbon graphite secondary seal rings axially biased by a first set of springs and radially biased by a second set of springs.

10 Claims, 1 Drawing Sheet

U.S. Patent
Dec. 22, 1992
5,172,918
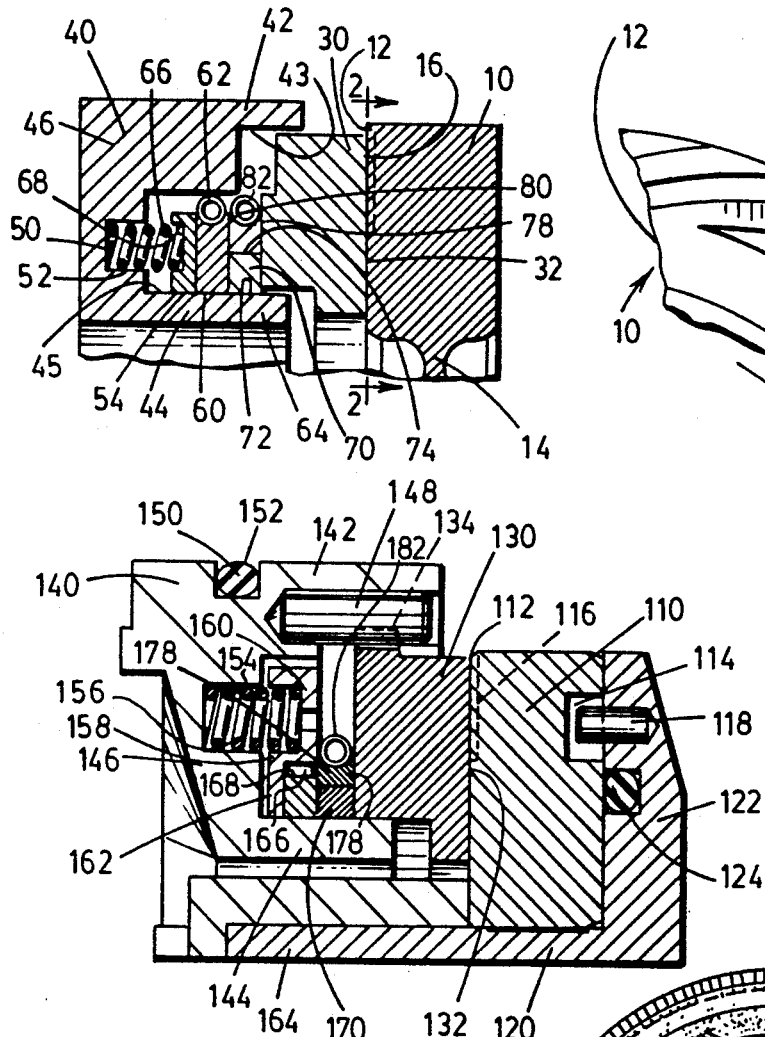
FIG. 1
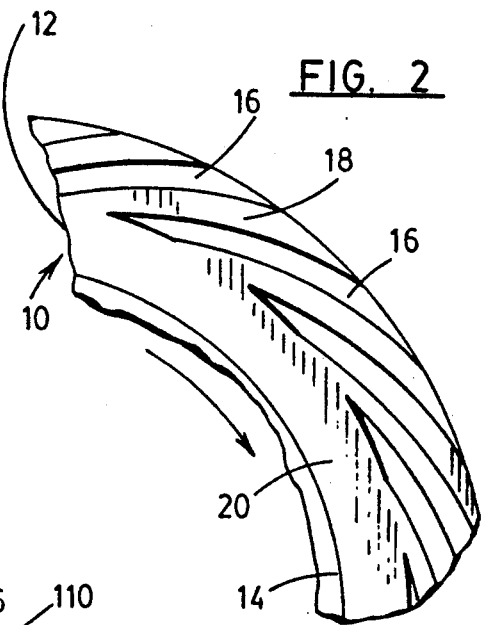
FIG. 2
FIG. 4
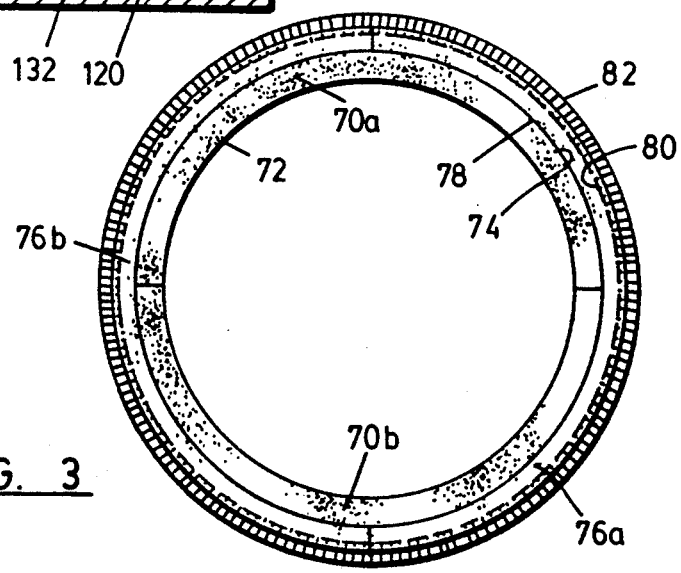
FIG. 3

SECONDARY SEAL FOR GAS TURBINES

BACKGROUND OF THE INVENTION

1. Field of the Invention

This invention relates to gas seals and specifically relates to non-elastomeric secondary seals for use in gas turbines.

2. Background Art

Gas turbines normally operate at great rotational speeds and higher temperatures. Shafts of typical gas turbine engines run up to rotational speeds of approximately 25,000 RPM. Temperatures are encountered in the range of 800° C. (1500° F.).

Conventional means for sealing the seal rings in a gas turbine seal can not be used because of the high temperature at high rotational speeds. For example, elastomeric O-rings can not be used to seal each of the rings to the respective shaft or housing because such rings would melt under the high temperatures.

SUMMARY OF THE INVENTION

This invention is a new and improved secondary seal for use in a gas turbine engine which seals between the primary ring and the stationary housing. The seal according to this invention includes a secondary seal comprising two rings. One ring is a carbon graphite ring comprising arcuate segments which are held together by a circumferential endless spring. Another seal ring adjacent the first and having a similar radial width comprises two sections. A first section adjacent the inner diameter of the primary ring has arcuate segments which have a radial width of approximately one half the radial width of the first seal ring. A second portion also comprising arcuate segments is disposed immediately outward of the first portion and also includes a circumferentially disposed spring which applies an inward pressure on both of the portions to seal between the inner diameter of the secondary seal and the retainer which retains the primary ring. The material comprising the rings is a high temperature inorganic carbon graphite which is able to withstand high temperatures. The secondary split ring is immediately axially adjacent the primary ring wall and a disc is positioned on the opposite side of the secondary seal rings. A spring provides an axial force which biases the discs, the secondary seal and the primary ring axially toward the rotating mating ring.

BRIEF DESCRIPTION OF THE DRAWINGS

FIG. 1 is a partial cross-sectional view of a sealing assembly for use in a gas turbine engine and illustrates the inventive secondary seal;

FIG. 2 is a sectional view taken generally along the plane indicated by lines 2—2 showing the primary ring of FIG. 1;

FIG. 3 illustrates one of the inventive seal rings of the secondary seal shown in FIG. 1; and FIG. 4 illustrates another embodiment of the inventive seal having a decreased radial height to provide clearance.

DETAILED DESCRIPTION OF THE PREFERRED EMBODIMENTS

Referring now to FIG. 1, the gas turbine seal comprising a mating ring 10 and a primary ring is illustrated. The mating ring 10 comprises a sealing face 12 and a connecting member (shown in partial section) for connecting the outer diameter portion of the mating ring 10 to a rotating shaft (not shown). The connecting member may be an inwardly connecting portion 14, as is partially shown in FIG. 1.

FIG. 2 shows a portion of the face 12 of primary ring 10. Face 12 of the mating ring 10 further comprises a plurality of downward pumping spiral grooves which extend from the outer circumference and partially across the width of face 12. Alternatively, these grooves may be on the primary ring, but for purposes of this description the face 12 of the mating ring is shown having the grooves. Adjacent spiral groove 16 are each separated by a land 18. An annular dam portion 20 having an ungrooved surface is disposed at the inner diameter of the mating ring 10. The ungrooved surface of the dam portion 20 defines a sealing dam which provides a contacting static seal when the seal faces are not rotating relative to each other. The lands 18 and the dam portion are shown at the same height and both are offset relative to the surface of the grooves 16.

FIG. 2 shows the mating ring 10 having spiral grooves 16 at the outer diameter for a seal system designed for a higher pressure which is present at the outer diameter of the sealing rings. Alternatively, the higher pressure may be at the inner diameter of the two sealing rings, thereby mandating the design of the mating ring with the grooves at the inner diameter and the annular dam at the outer diameter. Either of these designs can operate effectively and the design is chosen depending upon the needs of the particular application.

A primary ring 30 is disposed adjacent to and contacting the mating ring 10. Radially disposed sealing face 12 of the mating ring 10 presents an annular sealing surface which bears a similarly disposed radial sealing surface 32 of the primary ring 30. Primary ring 30 is connected through a retainer assembly to a housing (not shown) and remains stationary during operation of the seal. Mating ring 10 is relatively rotating together with the shaft (not shown) and during normal operation of a gas turbine seal would be relatively rotating at about 25,000 RPM relative to the primary ring 30.

The retainer assembly comprises the primary ring 30, a retainer, a secondary seal, a disc and a biasing means. The biasing means axially biases the disc, the secondary seal and the primary ring so that the primary ring sealing face 32 is biased against the face 12 of the mating ring 10.

The retainer assembly comprises a retainer 40 which has an outer diameter portion 42 disposed beyond the outer diameter of the primary ring 30. A suitable engagement means (not shown in FIG. 1) in the outer diameter portion 42 of the retainer engages the primary ring 30. A cylindrical inner diameter 43 is defined by the inner wall of the outer diameter portion 42. The inner cylindrical surface 43 provides clearance for the outer diameter of the primary ring 30 and for the other elements of the retainer assembly.

The retainer 40 further comprises an inner diameter portion 44 and a connecting portion 46 which connects the outer diameter portion 42 and the inner diameter portion 44. The three portions, 42, 44 and 46, of the retainer assembly 40 substantially enclose the primary ring and the retainer assembly. The inner diameter portion 44 has a cylindrical surface 45 which is opposed to the surface 43 of the outer diameter portion 42, the surfaces 43, 45 providing walls defining the enclosure for the retainer assembly. The connecting portion 46 of the retainer assembly includes a plurality of bores defining a number of spring seats 50, one of which is shown in FIG. 1.

The retainer 40 is axially and non-rotatably secured by conventional means (not shown) in the cavity defined by a housing (not shown) in the shaft (not shown). An O-ring (not shown in FIG. 1) or a non-elastomeric sealing means is disposed between the outer diameter of the retainer 40 and the housing (not shown) in which it is housed.

The circular bores defining the spring seats 50 in the connecting portion 46 of the retainer each provide a seat for a spring 52. An annular disc 54 also containing a plurality of bores defining spring seats 56 is disposed over the springs 52 to compress them against the spring seat 50. The inner diameter of the annular disc 54 is slightly larger than the outer diameter 45 of the inner retainer diameter 44. There are several springs 52 disposed around the annular connecting portion 46 of the retainer 40 and the springs 52 provide a uniform load on the disc 54.

The secondary seal consists of a first secondary seal ring 60 which comprises arcuate segments that are retained by a biasing means, such as circular spring 62. Ideally, all of the elements except for the springs 62 in the secondary seal are split into two arcuate segments. Radial pressure provided by spring 62 on the outer diameter of the first secondary seal ring member 60 holds the arcuate segments together and retains the end sections of the arcuate segments of the secondary seal ring 60 in contact with each other. The inner diameter 64 of the first secondary seal ring segment 60 is biased against the outer diameter 45 of the inner diameter portion 44 of the retainer. Thus, the spring 62 provides an inward bias on the first secondary seal member 60 to provide a seal between the inner diameter 64 and the cylindrical surface 45. Seal member 60 comprises an annular end wall 66 on which the disc 54 is biased and a second end wall 68, which is adjacent the second secondary seal ring.

Referring now to FIGS. 1 and 3, the second secondary seal ring comprises two portions having different diameters from each other and a spring which retains the two portions on the surface 45 of the retainer inner diameter portion 44 The inner portion 70 of the second secondary seal ring comprises two arcuate semi-circular segments 70a and 70b which together form the annular inner portion 70. The dimensions of the inner portion 70 are such that when the ends of the two arcuate segments are joined to each other, the ring 70 provides a tight fit between the inner diameter 72 of the inner portion 70 and the cylindrical surface 45 of the retainer 40.

The inner portion 70 is disposed radially inward of the outer portion 76. An outer diameter 74 of the inner portion 70 is adjacent an inner diameter 78 of the outer portion 76 of the second secondary seal ring. The outer portion 76 comprises two arcuate segments 76a and 76b which are also joined together to form the annular outer portion 76. Once joined together as shown in FIG. 3, the surface of inner diameter 78 of the outer portion 76 provides a bias on the outer diameter 74 of the inner portion 70 to provide a seal therebetween.

A semi-circular outer diameter 80 of the outer portion 76 provides a groove to retain a second spring 82 which retains and biases the outer portion against the inner portion 70. It further biases the inner portion 70 against the retainer inner diameter portion 44.

Each of the inner portion 70 and outer portion 76 provides end walls which are contiguous to the end walls of the other to provide a smooth end wall surface for the second secondary seal ring. For ideal sealing, the end walls of the inner portion 70 and outer portion 76 are preferably parallel lapped. Simultaneous parallel lapping of the two portions together ensures a smooth contiguous surface on the end walls of the second secondary seal ring.

The second end wall 68 of the first secondary seal ring 60 provides an axial biasing force on both the end walls of the inner portion 70 and the outer portion 76. The opposite end walls of the inner and outer portions 70, 76 provides a biasing force on the mating ring 30 which in turn provides a load tending to close the gap between the primary ring 30 and mating ring 10.

The materials comprising the mating ring 10 can be a hard material such as Enconel 718. The primary ring 30 may comprise any of a hard material such as silicone carbide.

The secondary seal rings comprise a high temperature inorganic carbon or a salt impregnated carbon of a specific grade which can withstand high temperatures up to 800° C. (1500° F.).

A suitable dry lubricant is coated onto all of the surfaces of the secondary seal rings 60, 70, 76 for sealing between each of the rings and for sealing between the ring surfaces and other elements of the retainer assembly. The lubricant should also be coated onto the ends of the arcuate segments which comprise ring 60, inner portion 70 and outer portion 76 before the segments are joined. A suitable dry lubricant which has been found to be effective is molybdenum disulfide, which is commercially available as a powder.

The springs which provide the biasing force may comprise any of a conventional steel ring material such as spring steel or stainless steel. The disc and the retainer may also comprise steel or other suitable metal.

Several advantages derive from the configuration and materials used in the seal described relative to FIG. 1. Use of non-elastomeric elements permits the high temperature operation encountered in gas turbine engines. The secondary seal comprising the two rings provides a flexible secondary seal structure which also provides a pressure breakdown of the high pressure presented by the gas turbine. The pressure breakdown occurs between the two separate seal ring configurations 60 and 70, 76 of the secondary seal. Any leaking of gas must occur through the seal which is provided between the sealing surfaces 64, 72 and the retainer inner cylindrical surface 45 or conversely through the end wall contacting areas of the seal rings. Because all of the elements within the retainer assembly are stationary, the pressures provided by the springs 52 in the axial direction and by the springs 62 and 82 in the radial direction maintain leakage to a minimum.

To further provide a more circuitous path and to avoid excessive leaking, the splits in the arcuate segments comprising the various portions of the seal rings are staggered. A staggered configuration is shown in FIG. 3 where the split in the inner portion 70 is disposed 90° relative to the split in the outer portion 76.

Another embodiment of this invention is illustrated in FIG. 4. In a cross-sectional view of a gas seal, also of the non-contacting type, a similar configuration of elements is provided. The configuration of the elements is somewhat similar to that shown in FIG. 1. A mating ring 110 comprises a sealing surface 112 having spiral grooves 116 disposed part way across the face 112. A bore 114 provides an engagement means for a pin 118 which engages the bore 114 in the mating ring 110. An annular sleeve 120 surrounds the shaft (not shown), the sleeve 120 having a radially upturned flange 122, which together provide support for the mating ring 110. An O-ring 124, which may be metallic, provides a seal between the sleeve and the mating ring 110. This sleeve 120 together with the flange 122 and the mating ring 110 all rotate together with the shaft (not shown).

A stationary primary ring 130 having a sealing face 132 and grooved notches 134 for engagement is adjacent the mating ring 110 and is stationary relative to the rotating mating ring 110. A retainer assembly similar to that shown in FIG. 1 comprises a retainer, a spring means for providing axial biasing force, a disc for transferring the axial biasing force of the spring, a secondary seal and the primary ring 130. The retainer 140 includes an outer diameter portion 142, an inner diameter portion 144 and a connecting portion 146. A pin 148 provides an engagement means for the notch 134 in the primary ring 130. The function of the engagement means is discussed above relative to the embodiment of FIG. 1. An O-ring 150, which may comprise a soft metal, is provided in a grooved channel 152 in the outer diameter portion 142 and provides a seal between the retainer 140 and the housing (not shown).

An aperture 154 provided in the connecting portion 146 defines a spring seat for a spring 156. The spring 156 provides an axial biasing force to the elements of the retainer assembly through a disc 158 also having a bore defining a second spring seat 160 for the other end of the spring 156. An inner diameter portion 162 of the disc 158 engages a first secondary seal ring 164. The spring 156 provides a load on an end wall of the disc 158 when the spring 156 is compressed, and the end wall provides a biasing force on the secondary seal.

The secondary seal ring 164 is similar in configuration to the secondary seal ring 60 of FIG. 1. One difference is that the radial bias for secondary seal ring 164 is provided by the a wave spring 166 on the two arcuate segments of the seal ring 164. Also, a cylindrical outer diameter surface 168 provides a cup-shaped receptacle for the wave spring 166. The wave spring is a flattened undulating ring, and includes dimensions for biasing both against the cylindrical wall of the disc 158 and against an outer diameter surface of the secondary seal ring 168. The second secondary seal ring 170, 178 is identical in structure in configuration to that of ring 70, 78 which is shown in FIGS. 1 and 3. The spring 182 provides a biasing force similar to that provided by spring 82 shown in FIG. 1.

The flattened undulating wave spring 166 permits the use of a secondary seal ring 164 which has a shorter radial width and which provides a clearance for the disc 158. In certain seal configurations, the balance provided by disc 158 is important and the spring 156 may be required to be radially outward of the secondary seal. Also, the cylindrical wall 168 does not present any axial load onto the spring 164 and provides for additional protection against chipping of the edges of ring 164. The embodiment of FIG. 4 is otherwise similar to that of FIG. 1, and provides an effective seal between the primary ring 130 and the retainer 140.

We claim:

1. A secondary seal in a rotary mechanical end face seal assembly for use in a high temperature environment, the seal assembly comprising a first seal ring sealed against a rotating shaft and having a generally planar annular first seal ring face with spiral grooves extending at least part way across said first seal ring face and a second seal ring sealed against the housing, the second seal ring having a second seal ring face being generally planar and opposed to said first seal ring face, said second seal ring being movable axially of the shaft, said seal assembly further comprising a first biasing means adapted to urge the axially movable second seal ring toward the other seal ring to bring said seal faces close to one another to have a rotatable sealing engagement relative to one another, means positioning said axially movable ring generally coaxially of the other ring, a retainer means for retaining said second seal ring and a secondary seal ring and said retainer means, said secondary seal comprising a first annular secondary seal ring, said first annular secondary seal ring including at least two arcuate segments joined together and being retained and biased in a radial direction against said retainer by a second biasing means, said first annular secondary seal ring further comprising one end wall for receiving the biasing force applied by said first biasing means and a second end wall for transmitting the biasing force received from said first biasing means, said secondary seal further having a second annular secondary seal ring, said second annular secondary seal ring comprising an inner portion having at least two arcuate segments and an outer portion having at least two arcuate segments, said inner portion being disposed radially inwardly of said outer portion, said inner portion and said outer portion together comprising said second secondary seal ring and a third biasing means for biasing said outer portion against said inner portion and also biasing said inner portion against said retainer, said secondary seal rings being disposed adjacent each other and being axially movable and being disposed between said first biasing means and said first seal ring, whereby said second and third biasing means radially bias said respective first and second secondary seal rings to provide a fluid tight seal to the retainer, and said first biasing means providing a biasing force through the secondary seal rings and to said end wall of said second secondary seal ring and biasing said second secondary seal end wall against said first seal ring and thereby providing a fluid tight seal between said secondary seal and said first seal ring.

2. The secondary seal assembly according to claim 1 wherein said first biasing means is disposed on an inside wall of said retainer.

3. The secondary seal assembly according to claim 1 wherein at least one of said second and third biasing means comprises a spring.

4. The secondary seal ring assembly according to claim 1 wherein at least one of said secondary seal rings further comprises an outer diameter surface forming an upturned outwardly facing cup shaped receptacle for receiving one of said second or third biasing means which comprises a wave spring.

5. The secondary seal ring assembly according to claim 1 wherein at least one of the secondary seal rings comprises a high temperature inorganic carbon.

6. The secondary seal ring assembly according to claim 5 wherein both of the secondary seal rings comprise a high temperature inorganic carbon.

7. The secondary seal ring assembly according to claim 5 further comprising a dry lubricant.

8. The secondary seal ring assembly according to claim 1 wherein at least one of the secondary seal rings comprises a salt impregnated carbon.

9. The secondary seal ring assembly according to claim 8 wherein both of the secondary seal rings comprise a salt impregnated carbon.

10. The secondary seal ring assembly according to claim 7 further comprising a dry lubricant.

* * * * *